United States Patent
Hillmann

[11] Patent Number: 5,470,159
[45] Date of Patent: Nov. 28, 1995

[54] CAGE GUIDE FOR ROLLING BEARINGS, IN PARTICULAR FOR AXIAL CYLINDRICAL ROLLER BEARINGS

[75] Inventor: Reinhart Hillmann, Schweinfurt, Germany

[73] Assignee: SKF GmbH, Schweinfurt, Germany

[21] Appl. No.: 101,832

[22] Filed: Aug. 4, 1993

[30] Foreign Application Priority Data

Sep. 28, 1992 [DE] Germany .......... 42 32 433.5

[51] Int. Cl.$^6$ .................................. F16C 33/46
[52] U.S. Cl. .................. 384/623; 384/614; 384/524
[58] Field of Search .................. 384/524, 614, 384/623, 621, 523, 572, 452–455, 470, 494, 574, 604, 608, 618, 126–128, 51, 57, 58

[56] References Cited

U.S. PATENT DOCUMENTS

| | | | |
|---|---|---|---|
| 550,100 | 11/1895 | Dubreuil | 384/524 |
| 612,390 | 10/1898 | Archdeacon | 384/614 |
| 847,487 | 3/1907 | Maxwell | 384/524 |
| 1,044,342 | 11/1912 | Buckley | 384/618 |
| 2,983,559 | 5/1961 | Blinder | 384/524 |
| 3,022,124 | 2/1962 | Borden | 384/524 |
| 3,504,952 | 4/1970 | Farmer | 384/58 X |
| 3,661,431 | 5/1972 | Wisecarver | 384/58 X |

FOREIGN PATENT DOCUMENTS

| | | | |
|---|---|---|---|
| 31203 | 9/1964 | Germany . | |
| 4217663 | 12/1992 | Germany | 384/51 |
| 92/00463 | 1/1992 | WIPO | 384/572 |

*Primary Examiner*—Thomas R. Hannon

[57] ABSTRACT

An axial rolling bearing including first and second bearing disks, a plurality of rolling members situated between bearing disks and a cage for maintaining rolling members in spaced relationship to each other, the improvement of a radial guidance system for cage comprising a plurality of bearing elements mounted to the cage and engaging at least one of the bearing disks, and adjusting each of the bearing elements in a radial direction for reducing friction between the cage and the bearing disk engaged by the bearing elements.

4 Claims, 3 Drawing Sheets

CAGE GUIDE FOR ROLLING BEARINGS, IN PARTICULAR FOR AXIAL CYLINDRICAL ROLLER BEARINGS

BACKGROUND OF THE INVENTION

1. Field of the Invention

The invention relates to a cage guide for rolling bearings, and in particular to axial cylindrical roller bearings having rolling members which support the cage on a bearing ring or a bearing disk.

2. Brief Description of the Prior Art

Cage guides of the type described above are known. Supporting the cage of an axial cylindrical roller bearing by means of cylindrical rollers of small diameter which slide in the cage during operation of the bearing is disclosed for example in German industrial patent 31,203. The friction between the cylindrical rollers and the cage is relatively great in these known bearings. In addition, assembly of the cage guide is awkward and time consuming, since it consists of many parts.

The object of the present invention is to provide a cage guide which has substantially reduced friction and can be assembled without difficulty.

SUMMARY OF THE INVENTION

According to the invention this object is accomplished in a cage guide of the type mentioned above in that bearing surfaces, which may be supported rolling or sliding types, are provided on bearing journals connected with the cage and arranged with one race resting on a bearing surface, such as a rolling bearing ring or a rolling bearing disk.

The rollers are preferably arranged on bearing journals which may be displaced by cams, so that precise adjustment of the cage with respect to the bearing rings or bearing disks is possible.

BRIEF DESCRIPTION OF THE DRAWINGS

The forgoing summary of the invention and further objects and advantages will become more apparent from the following more detailed description of the preferred and alternate embodiments.

The invention is explained in detail below by means of the description of an example illustrated in the drawing, wherein.

DETAILED DESCRIPTION OF THE PREFERRED EMBODIMENT

Figure 1:
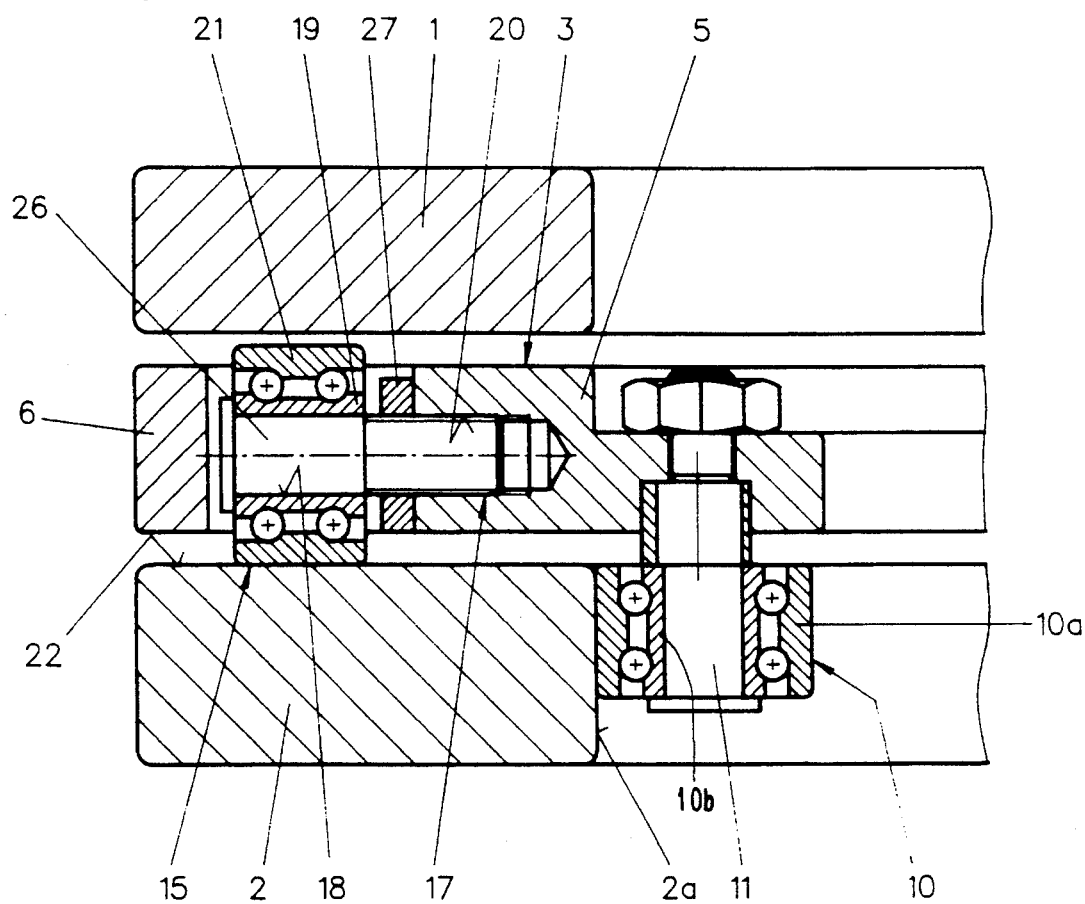
FIG. 1 shows a section A-B according to FIG. 3 of a cage guide according to the invention.
Figure 2:
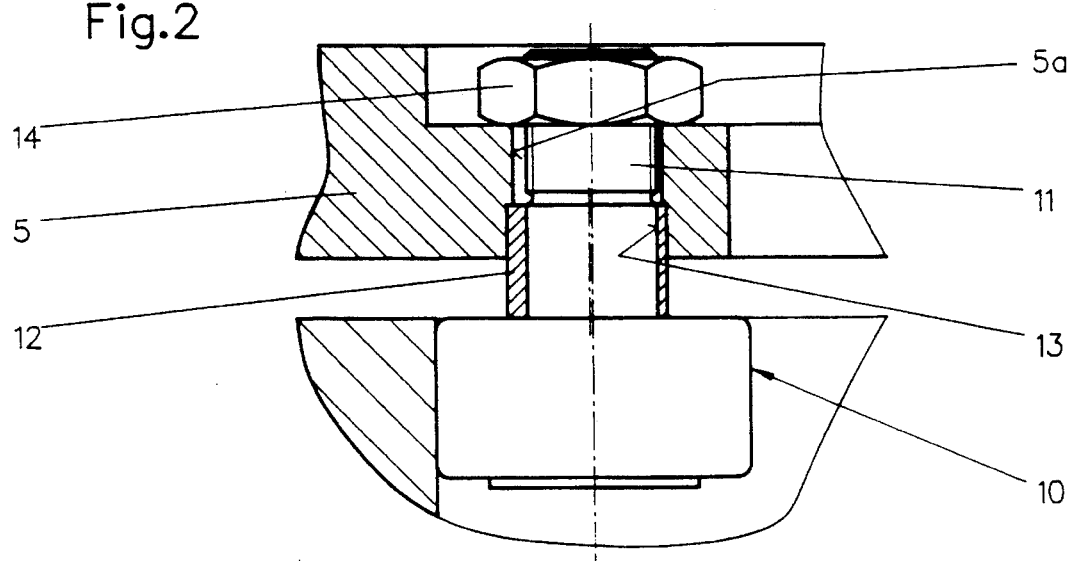
FIG. 2 is an enlarged representation of a roller for the radial guidance of the cage, FIG. 3 describes a part of a top view of the cage according to FIG. 1.
Figure 3:
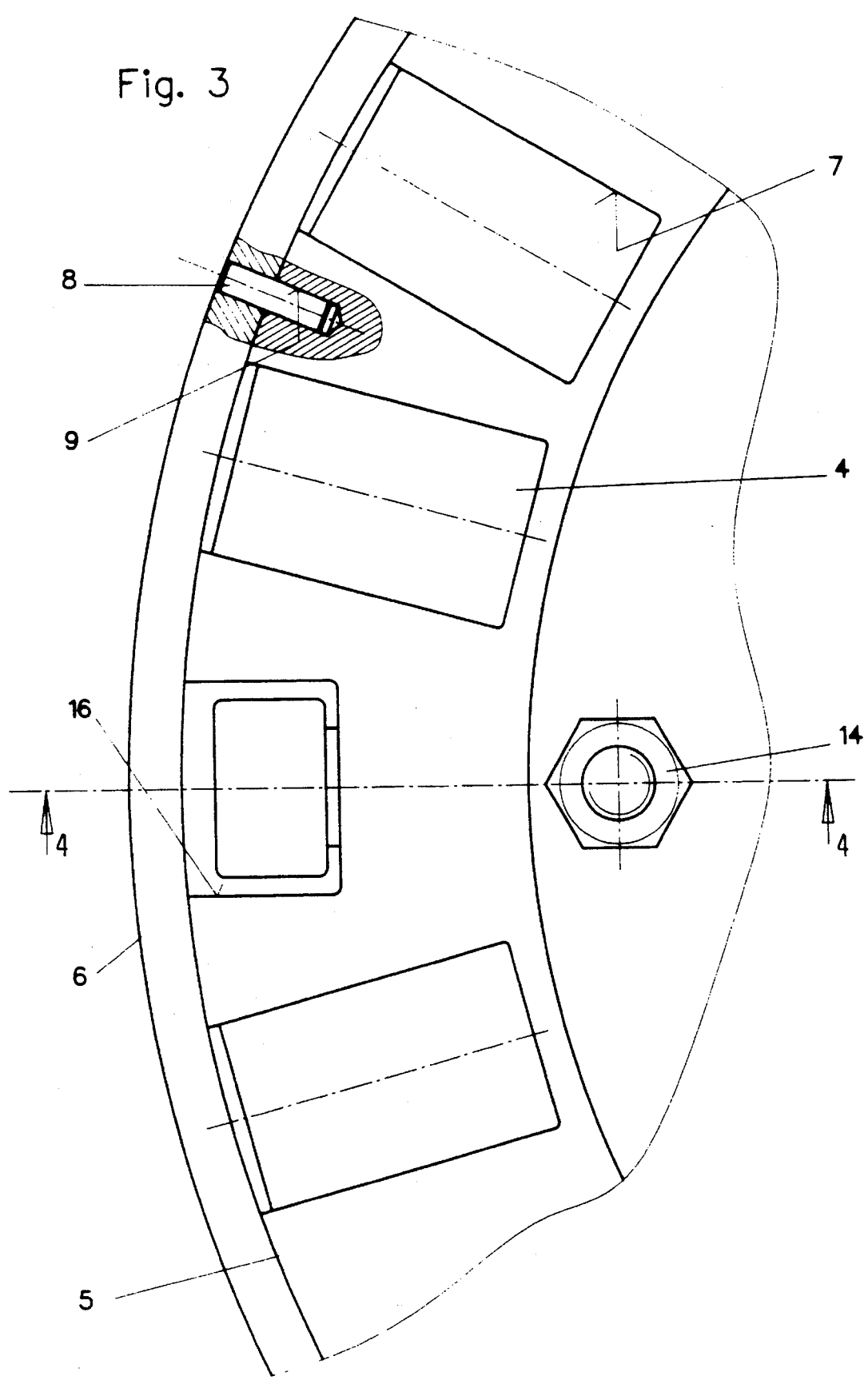

The axial cylindrical roller bearing illustrated in FIGS. 1–3 consists of two flat bearing elements 1, 2, which may be either a ring or a disk, and cylindrical rollers 4 arranged between them in a cage 3. The cage 3 is composed of a basic cage body 5 and a sealing ring 6, which holds the cylindrical rollers 4 in the pockets 7. The sealing ring 6 is fixed by dowel pins 8, which engage in bores 9 in the basic cage body 5.

Guidance of the cage 3 in the radial direction is effected by a plurality of rollers 10, designed as conventional rolling bearings having outer and inner races 10a and 10b respectively, and distributed on the periphery, each of which is seated on a bearing journal 11 which, with insertion of a sleeve 12 having an eccentric bore 13, is arranged in a bore 5a of the cage 3 and is secured by a nut 14 to the basic cage body 5. The eccentric sleeve 12 acts as a spacer between the roller 10 and the basic cage body 5. The radial guidance clearance between the outer ring 10a of the roller 10 serving as a race and the bore face 2a of the bearing disk 2 can be adjusted and, alternatively, later corrected by rotation of the eccentric sleeve 12, so that precise and low-friction radial guidance of the cage 3 is ensured.

Guidance of the cage 3 in the axial direction is obtained by a plurality of rollers 15 distributed on the periphery, each of which is arranged in a recess 16 of the cage 3 and fixed by a bearing journal 17, which engages in the bore 18 of the inner race 19 of the respective roller 15 and in a threaded hole 20 of the basic cage body 5. The outer race 21 of the roller 15 lies on the running surface 22 of the lower bearing disk 2 and guides the cage 3 between the bearing disks 1, 2 so that it does not rest on the cylindrical rollers 4. This further reduces the friction between the cylindrical rollers 4 and the cage 3. After assembly of the rollers 15, the sealing ring 6 is mounted and fixed in the manner described above.

Figure 4:
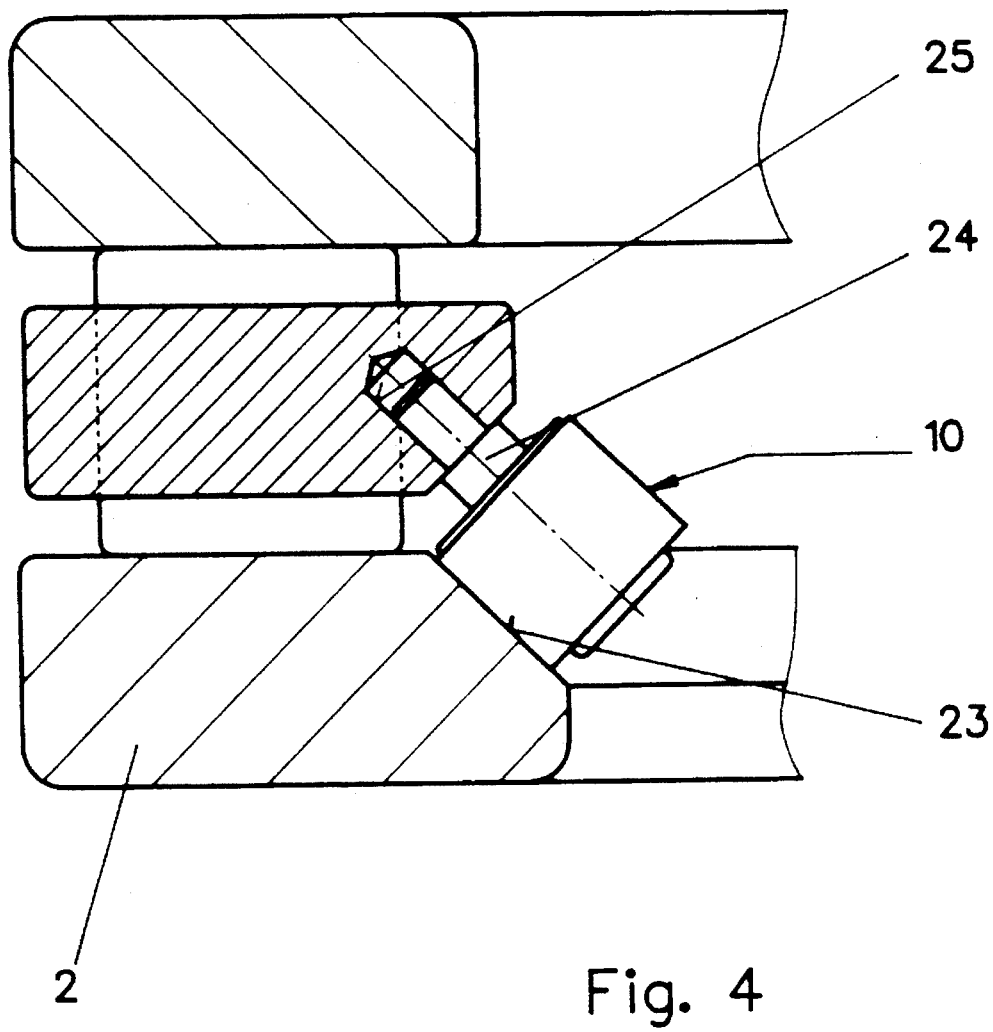
FIG. 4 shows an additional embodiment of a cage guide according to the invention.

The axial cylindrical roller bearing illustrated in FIG. 4 differs from the embodiment represented in FIGS. 1 to 3 essentially in that the rollers 10 rest on an inclined surface 23 of the bearing disk 2 and are each arranged on a bearing journal 24 which is pressed into a bore 25 of the cage.

For adjustment in the vertical direction (FIG. 1), the rollers 15 are arranged on an eccentric section 26 of the bolt 17 and are secured in position by means of suitable attachment mechanism 27.

Although the invention has been disclosed with roller elements, it is understood that slider elements may also be used. Although illustrative embodiments of the invention have been described and illustrated, it will be understood that the invention is not limited to the precise embodiments described and shown, and that various changes and modifications may be effected by one skilled in the art without departing from the scope or spirit of the invention.

I claim:

1. In an axial rolling bearing including first and second bearing disks, a plurality of rolling members situated between said bearing disks, and a cage for maintaining said rolling members in spaced relationship to each other, the improvement of a radial guidance system for said cage comprising a plurality of bearing means, each mounted to said cage and engaging the first of said bearing disks, means for adjusting each of said bearing means in a radial direction for reducing friction between said cage and said bearing disk by said bearing means, and a plurality of axial guidance means for maintaining the cage axially spaced between and not contacting said bearing disks, each axial guidance means comprising a bearing element including inner and outer races and included rolling elements, and journal means coupling said bearing element to said cage, the journal situated with its axis oriented generally radially, and said outer race thereof engaging one of said bearing disks.

2. A bearing according to claim 1, wherein said cage has a plurality of circumferentially spaced recesses, and each of said axial guidance means bearings situated in one of said recesses.

3. In an axial rolling bearing including first and second bearing disks, a plurality of rolling members situated between said bearing disks, and a cage for maintaining said rolling members in spaced relationship to each other, the improvement of a radial guidance system for said cage comprising a plurality of bearing means, each mounted to said cage and engaging the first of said bearing disks, and means for adjusting each of said bearing means in a radial direction for reducing friction between said cage and said bearing disk engaged by said bearing means, wherein each of said bearing means comprises inner and outer races and rolling elements between said races, and wherein each of said means for adjusting each of said bearing means comprises a journal secured to said cage and eccentric means carried by the journal and engaging the inner race of said bearing means, and whereby rotation of said journal and eccentric means moves said bearing means in a radial direction, and wherein said first bearing disk has an inclined bore surface, and each of said journals is oriented in said cage such that the bearing carried by said journal engages said inclined surface.

4. In an axial rolling bearing including first and second bearing disks, a plurality of rolling members situated between said bearing disks, and a cage for maintaining said rolling members in spaced relationship to each other, the improvement of a radial guidance system for said cage comprising a plurality of bearing means, each mounted to said cage and engaging the first of said bearing disks, and means for adjusting each of said bearing means in a radial direction for reducing friction between said cage and said bearing disk engaged by said bearing means, wherein each of said bearing means comprises inner and outer races and rolling elements between said races, wherein each of said means for adjusting each of said bearing means comprises a journal secured to said cage and eccentric means carried by the journal and engaging the inner race of said bearing means, and whereby rotation of said journal and eccentric means moves said bearing means in a radial direction, and wherein said cage and first bearing disk each include a face thereof inclined with respect to an adjoining face thereof, each of said bearing means having the inner race thereof mounted to means journaled into one of said faces and the outer race thereof resting on the other of said faces.

* * * * *